(12) United States Patent
Takahashi et al.

(10) Patent No.: US 11,333,828 B2
(45) Date of Patent: May 17, 2022

(54) OPTICAL CONNECTION COMPONENT

(71) Applicant: FURUKAWA ELECTRIC CO., LTD., Tokyo (JP)

(72) Inventors: Masanori Takahashi, Tokyo (JP); Mitsuhiro Iwaya, Tokyo (JP); Tsunetoshi Saito, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/021,034

(22) Filed: Sep. 15, 2020

(65) Prior Publication Data
US 2020/0408991 A1 Dec. 31, 2020

Related U.S. Application Data

(63) Continuation of application No. PCT/JP2019/010988, filed on Mar. 15, 2019.

(30) Foreign Application Priority Data

Mar. 29, 2018 (JP) .............................. JP2018-064322

(51) Int. Cl.
*G02B 6/25* (2006.01)
*G02B 6/255* (2006.01)
*G02B 6/42* (2006.01)

(52) U.S. Cl.
CPC ........... *G02B 6/255* (2013.01); *G02B 6/4216* (2013.01)

(58) Field of Classification Search
CPC ................... G02B 6/255; G02B 6/4216
(Continued)

(56) References Cited

U.S. PATENT DOCUMENTS 5,548,677 A 8/1996 Kakii et al.
6,769,811 B2 8/2004 Hall et al.
(Continued)

FOREIGN PATENT DOCUMENTS

JP 06-289236 A 10/1994
JP H10-246838 A 9/1998
(Continued)

OTHER PUBLICATIONS

International Search Report dated May 7, 2019 in PCT/JP2019/010988 filed on Mar. 15, 2019, 2 pages.
(Continued)

*Primary Examiner* — Jerry M Blevins
(74) *Attorney, Agent, or Firm* — Oblon, McClelland, Maier & Neustadt, L.L.P.

(57) ABSTRACT

An optical connection component includes: a plurality of types of optical fibers; a plurality of high relative refractive-index difference optical fibers in each of which a relative refractive-index difference between a core and a cladding is larger than a relative refractive-index difference in each of the plurality of types of optical fibers and which are fusion spliced to the plurality of types of optical fibers; and a fixing member having a plurality of V-shaped grooves that receive the high relative refractive-index difference optical fibers with coating removed, the fixing member being configured to fix relative positions of the high relative refractive-index difference optical fibers and an optical element when optically coupling the high relative refractive-index difference optical fibers, which have been fusion spliced to the plurality of types of optical fibers, to the optical element. The high relative refractive-index difference optical fibers are of the same type.

5 Claims, 8 Drawing Sheets

(58) Field of Classification Search
USPC .......................................................... 385/96
See application file for complete search history.

(56) References Cited

U.S. PATENT DOCUMENTS

| 10,007,073 | B2 | 6/2018 | Takahashi et al. | |
|---|---|---|---|---|
| 2004/0042731 | A1 | 3/2004 | Hall | |
| 2004/0218867 | A1* | 11/2004 | Nakamura | G02B 6/262 |
| | | | | 385/43 |
| 2007/0086707 | A1* | 4/2007 | Suzuki | G02B 6/255 |
| | | | | 385/58 |
| 2007/0196053 | A1 | 8/2007 | Kewitsch | |
| 2010/0014802 | A1 | 1/2010 | Chapman et al. | |
| 2017/0199341 | A1* | 7/2017 | Takahashi | G02B 6/122 |

FOREIGN PATENT DOCUMENTS

| JP | 2000-066062 A | 3/2000 |
|---|---|---|
| JP | 2000-298219 A | 10/2000 |
| JP | 2002-040290 A | 2/2002 |
| JP | 2004-078028 A | 3/2004 |
| JP | 2004-101990 A | 4/2004 |
| JP | 2007-226120 A | 9/2007 |
| JP | 2011-018765 A | 1/2011 |
| JP | 2016-126339 A | 7/2016 |
| JP | 6089147 B2 | 3/2017 |
| JP | 2017-161557 A | 9/2017 |
| WO | WO 2016/056659 A1 | 4/2016 |

OTHER PUBLICATIONS

Japanese Office Action dated Oct. 12, 2021 in Japanese Patent Application No. 2018-064322 w/English machine translation, 8 pages.

Japanese Office Action dated Mar. 22, 2022, with English machine translation, in corresponding Japanese patent Application No. 2018-064322, 10 pages.

* cited by examiner

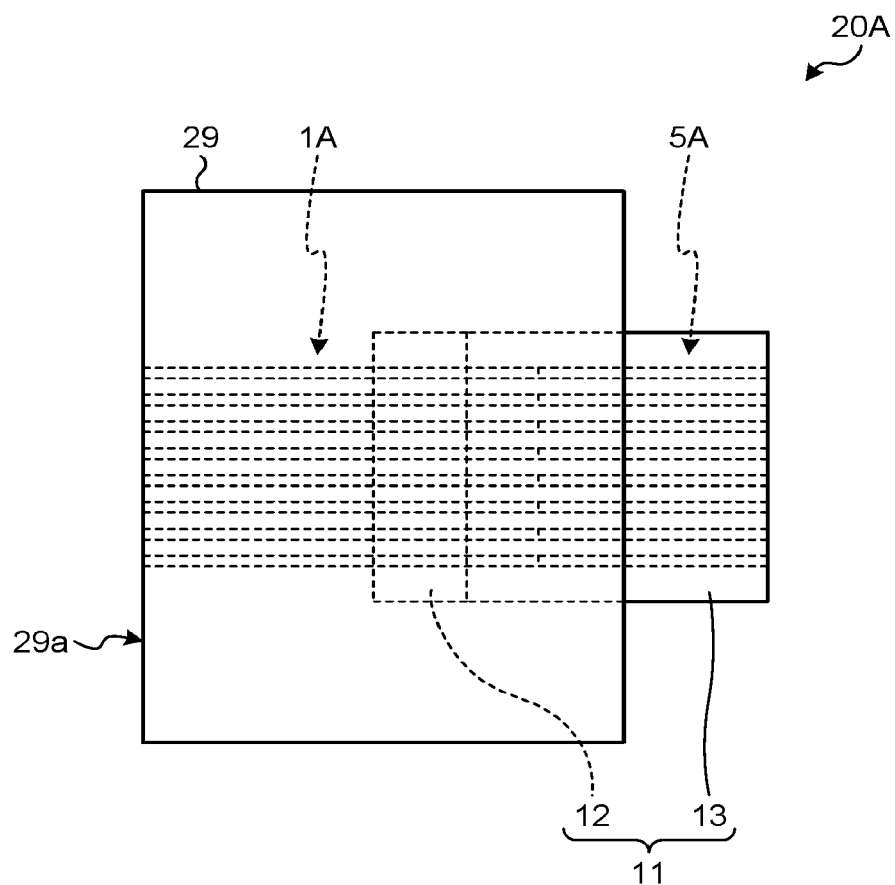

OPTICAL CONNECTION COMPONENT

CROSS-REFERENCE TO RELATED APPLICATION(S)

This application is a continuation of International Application No. PCT/JP2019/010988, filed on Mar. 15, 2019 which claims the benefit of priority of the prior Japanese Patent Application No. 2018-064322, filed on Mar. 29, 2018, the entire contents of which are incorporated herein by reference.

BACKGROUND

The present disclosure relates to an optical connection component.

In the related art, in optical waveguides constituting optical elements such as a planar lightwave circuit (PLC) and a silicon waveguide chip, the reduction in connection loss between the optical waveguide and an optical fiber to be optically connected (hereinafter appropriately referred to as "optical fiber to be connected") is a problem. To reduce the connection loss, the mismatch in mode field diameter between an optical waveguide whose mode field diameter (MFD) is significantly smaller than that of an optical fiber to be connected and the optical fiber to be connected needs to be reduced.

As a technology therefor, a technology in which a high relative refractive-index difference optical fiber (hereinafter appropriately abbreviated as "high-$\Delta$ optical fiber") whose relative refractive-index difference between a core and a cladding is larger than that in an optical fiber to be connected is fusion spliced to the optical fiber to be connected, and an optical waveguide in an optical element and the optical fiber to be connected are connected through the high-$\Delta$ optical fiber has been proposed (see, for example, Japanese Patent No. 6089147). In the technology disclosed in Japanese Patent No. 6089147, the high-$\Delta$ optical fiber with the coating peeled is fixed in a V-shaped groove of a glass block-shaped fixing member, and the fixing member is connected to an optical element so that an optical waveguide in the optical element and the high-$\Delta$ optical fiber in the V-shaped groove are optically coupled. In general, the mode field diameter of the high-$\Delta$ optical fiber is closer to the mode field diameter of the optical waveguide than the mode field diameter of the optical fiber to be connected, and hence the connection loss can be reduced by interposing the high-$\Delta$ optical fiber between the optical fiber to be connected and the optical waveguide.

SUMMARY

There is a need for providing an optical connection component which can reduce the connection loss between an optical waveguide in an optical element and an optical fiber when the optical waveguide and the optical fiber are optically coupled.

According to an embodiment, an optical connection component includes: a plurality of types of optical fibers; a plurality of high relative refractive-index difference optical fibers in each of which a relative refractive-index difference between a core and a cladding is larger than a relative refractive-index difference in each of the plurality of types of optical fibers and which are fusion spliced to the plurality of types of optical fibers; and a fixing member having a plurality of V-shaped grooves that receive the high relative refractive-index difference optical fibers with coating removed, the fixing member being configured to fix relative positions of the high relative refractive-index difference optical fibers and an optical element when optically coupling the high relative refractive-index difference optical fibers, which have been fusion spliced to the plurality of types of optical fibers, to the optical element. Further, the high relative refractive-index difference optical fibers are of the same type.

BRIEF DESCRIPTION OF THE DRAWINGS

FIG. 11 is a diagram schematically illustrating a configuration example of an optical connection component according to a modification of the second embodiment of the present disclosure.

DETAILED DESCRIPTION

With improved functions of the optical element, a plurality of types of optical fibers may be connected to an optical element. In this case, the number of types of high-$\Delta$ optical fibers to be fusion spliced to the plurality of types of optical fibers to be connected is multiple in general correspondingly to the types of optical fibers to be connected to be fusion spliced. For example, when a polarization maintaining optical fiber is included in the plurality of types of optical fibers to be connected, a polarization maintaining type high-$\Delta$ optical fiber of the same type is fusion spliced to the polarization maintaining optical fiber. The plurality of types of high-$\Delta$ optical fibers fusion spliced to the plurality of types of optical fibers to be connected are fixed in a plurality of V-shaped grooves formed in parallel in the fixing member in the state in which the coating is peeled. By connecting the fixing member to the optical element, the optical waveguides constituting the optical element and the plurality of types of high-$\Delta$ optical fibers are optically coupled.

However, in the above-mentioned plurality of types of high-Δ optical fibers, the cladding diameters are different among high-Δ optical fibers of different types, and hence the positions of cores in the V grooves may vary among the plurality of types of high-Δ optical fibers fixed in the V-shaped grooves of the fixing member. Due to this, the center axes of cores deviate between the optical waveguide in the optical element and the high-Δ optical fiber in the V-shaped groove (hereinafter appropriately referred to as "core axis deviation"), with the result that the connection loss between the optical waveguide and the high-Δ optical fiber may increase.

Referring to the accompanied drawings, optical connection components according to embodiments of the present disclosure are described below. Note that the present disclosure is not limited by the embodiments described below. In the figures, the same or corresponding elements are denoted by the same reference symbols as appropriate. Further, the figures are schematic, and it should be understood that the relationships and ratios of dimensions of the elements may be different from the actual ones. Parts with different relationships and ratios of the dimensions may be included in the figures. In this specification, a cutoff wavelength refers to a cutoff wavelength under a 22-m method defined by International Telecommunication Union (ITU-T) G.650.1. The terms that are not particularly defined in this specification comply with the definitions and measurement methods under ITU-T G.650.1 as appropriate.

First Embodiment

Figure 1:
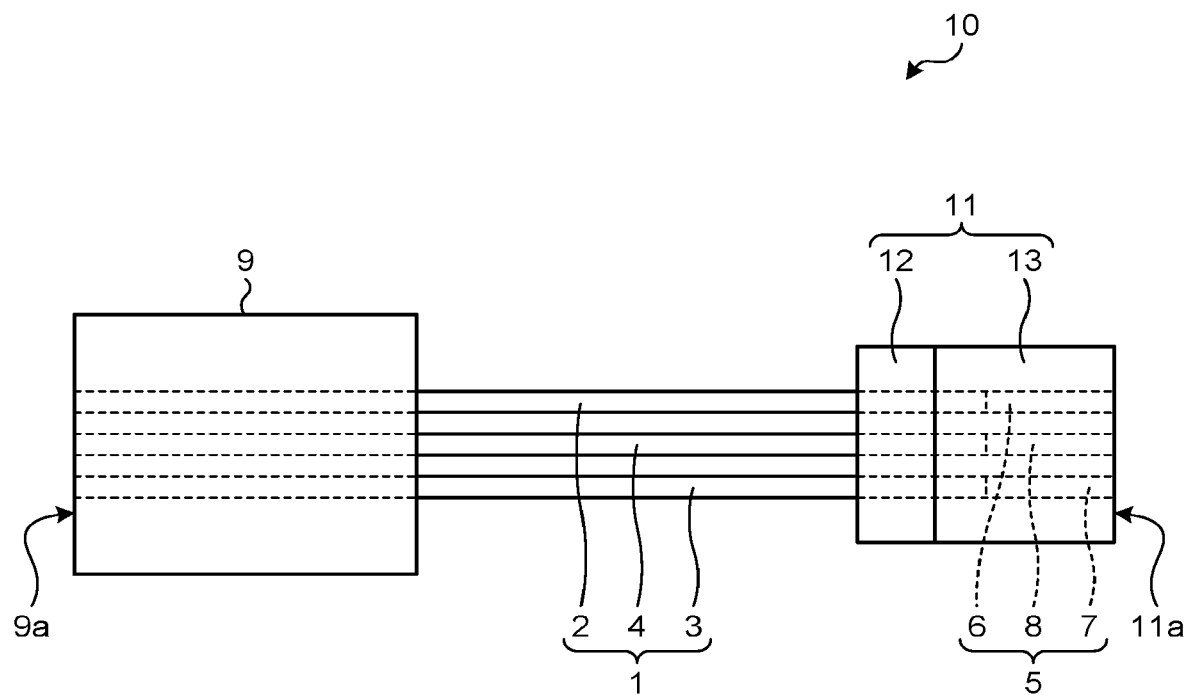
FIG. 1 is a diagram schematically illustrating a configuration example of an optical connection component according to a first embodiment of the present disclosure.

FIG. 1 is a diagram schematically illustrating a configuration example of an optical connection component according to a first embodiment of the present disclosure. This optical connection component 10 is a component for connecting an optical fiber to be connected and an optical waveguide in an optical element to each other with low loss. As illustrated in FIG. 1, the optical connection component 10 includes a plurality of types of optical fiber arrays 1, a plurality of the same type of high-Δ optical fiber arrays 5, a ferrule 9, and a fixing member 11.

The plurality of types of optical fiber arrays 1 include a plurality of types of optical fibers to be connected. In the first embodiment, as illustrated in FIG. 1, the plurality of types of optical fiber arrays 1 include, for example, two types of three optical fibers, that is, single-mode optical fibers 2 and 3 and a polarization maintaining optical fiber 4. Note that the number of optical fibers included in the plurality of types of optical fiber arrays 1 is not limited to three.

The single-mode optical fibers 2 and 3 are normal single-mode optical fibers complying with ITU-T G.652 and having the zero-dispersion wavelength in a 1.3 μm band. In a normal single-mode optical fiber, the relative refractive-index difference of a core with respect to a cladding is approximately 0.3%, and the mode field diameter at a wavelength of 1,550 nm is 10 to 11 μm. On the other hand, the polarization maintaining optical fiber 4 is an optical fiber for propagating light in a single mode while maintaining the place of polarization. As illustrated in FIG. 1, for example, the single-mode optical fibers 2 and 3 and the polarization maintaining optical fiber 4 are arranged side by side in parallel to one another in a manner that the polarization maintaining optical fiber 4 is sandwiched between the single-mode optical fibers 2 and 3. The single-mode optical fibers 2 and 3 and the polarization maintaining optical fiber 4 may each be a single-core optical fiber, or may be collectively coated, that is, configured as an optical fiber tape core.

The plurality of the same type of high-Δ optical fiber arrays 5 include a plurality of (specifically, the same number as plurality of types of optical fiber arrays 1) high relative refractive-index difference optical fibers of the same type in each of which the relative refractive-index difference between a core and a cladding is larger than that in the plurality of types of optical fiber arrays 1. For example, as illustrated in FIG. 1, the plurality of the same type of high-Δ optical fiber 5 arrays include three high-Δ optical fibers 6, 7, and 8 of the same type.

In the first embodiment, the high-Δ optical fibers 6, 7, and 8 are each a high-Δ optical fiber of a polarization maintaining type. For example, the high-Δ optical fibers 6, 7, and 8 have the same configuration as that of the polarization maintaining optical fiber 4 except that the relative refractive-index difference between a core and a cladding is larger than that of optical fibers to be connected included in the plurality of types of optical fiber 1 arrays. In the high-Δ optical fibers 6, 7, and 8, the relative refractive-index difference of the core with respect to the cladding is 2.0% or more and 3.0% or less, and the mode field diameter at a wavelength of 1,550 nm is, for example, 3.0 μm or more and 5.0 μm or less.

The plurality of the same type of high-Δ optical fiber arrays 5 are fusion spliced to the above-mentioned plurality of types of optical fiber arrays 1. For example, as illustrated in FIG. 1, the high-Δ optical fiber 6 is fusion spliced to the single-mode optical fiber 2, the high-Δ optical fiber 7 is fusion spliced to the single-mode optical fiber 3, and the high-Δ optical fiber 8 is fusion spliced to the polarization maintaining optical fiber 4. The fusion-spliced high-Δ optical fibers 6, 7, and 8 are interposed between a plurality of optical waveguides (not illustrated) constituting an optical element and the plurality of types of optical fiber arrays 1 while being fixed to the fixing member 11, and are optically coupled to the plurality of optical waveguides.

Note that the relative refractive-index difference (Δ) between a core and a cladding is a numerical value determined by the following equation.

$$\Delta = \{(n_c - n_{cl})/n_c\} \times 100$$

where $n_c$ is the maximum refractive index of the core, and $n_{cl}$ is the refractive index of the cladding.

The optical fibers to be connected included in the plurality of types of optical fiber arrays 1 and the high-Δ optical fibers included in the plurality of the same type of high-Δ optical fiber arrays 5 are fusion spliced so as to suppress the connection loss to be low by appropriately determining heating conditions for fusion splicing, such as by applying thermally diffused expanded core (TEC) fusion, so that the change in mode field diameter at the fusion splice point is made smooth. In this manner, it is preferred that connection loss between the single-mode optical fiber 2 and the high-Δ optical fiber 6, connection loss between the single-mode optical fiber 3 and the high-Δ optical fiber 7, and connection loss between the polarization maintaining optical fiber 4 and the high-Δ optical fiber 8 be reduced to be 0.1 dB or less.

In the plurality of types of optical fiber arrays 1 and the plurality of the same type of high-Δ optical fiber arrays 5, the types of optical fibers (including high-Δ optical fibers) are determined by the cladding diameter, the core diameter, the relative refractive-index difference, and the positions and the number of cores in the cladding in the optical fiber and characteristics such as light propagation characteristics. For example, in optical fibers of the same type, the difference in cladding diameter (outer diameter of glass part) falls within an acceptable level described later. As a preferred example, the cladding diameters of optical fibers of the same type are equal to each other. Examples of the optical fibers of the same type include short optical fibers cut from long optical fibers in the same production lot. On the other hand, optical fibers of different types include, as exemplified by a normal single-mode optical fiber and a polarization maintaining optical fiber, optical fibers whose different in dimension such as the cladding diameter exceeds the above-mentioned acceptable level not only in the case of optical fibers having different light propagation characteristics but also in the case of optical fibers having the same light propagation characteristics (for example, the case of normal single-mode optical fibers and the case of polarization maintaining optical fibers). Examples of the optical fibers of different types include optical fibers in different production lots.

The ferrule 9 houses therein at least end portions of the plurality of types of optical fiber arrays 1 extending from the fixing member 11 on the opposite side of the plurality of the same type of high-Δ optical fiber arrays 5. In the first embodiment, as illustrated in FIG. 1, the ferrule 9 houses therein parts (the above-mentioned end portions) of the single-mode optical fibers 2 and 3 and the polarization maintaining optical fiber 4 extending from the fixing member 11 in a predetermined length from end surfaces thereof on the opposite side of the fusion splice points with the high-Δ optical fibers 6, 7, and 8. In other words, the middle parts of the single-mode optical fibers 2 and 3 and the polarization maintaining optical fiber 4 are exposed between the ferrule 9 and the fixing member 11 while being coated. The ferrule 9 is bonded to the single-mode optical fibers 2 and 3 and the polarization maintaining optical fiber 4 housed therein with adhesive, and fixes the relative positions thereof. In this case, the single-mode optical fibers 2 and 3 and the polarization maintaining optical fiber 4 are arranged side by side in parallel to one another, and the end surfaces thereof are flush with a ferrule end surface 9a (end surface of ferrule 9 on opposite side of fixing member 11).

The fixing member 11 is a member for optically coupling the plurality of the same type of high-Δ optical fiber arrays 5, which are fusion spliced to the plurality of types of optical fiber arrays 1, and an optical element (not illustrated) to be connected. For example, the fixing member 11 is a glass block made of silica-based glass. Note that the fixing member 11 is not limited to a glass block, and may be made of material whose physical properties (such as linear expansion coefficient) are closer to an optical element and an optical fiber so as not to apply unnecessary stress to the optical element and the optical fiber.

As illustrated in FIG. 1, the fixing member 11 houses therein and fixes the plurality of the same type of high-Δ optical fiber arrays 5 and a part of the plurality of types of optical fiber arrays 1 that are fusion spliced thereto. In this case, the high-Δ optical fibers 6, 7, and 8 included in the plurality of the same type of high-Δ optical fiber arrays 5 are fixed to the fixing member 11 while being arranged in parallel to one another, and the end surfaces thereof are flush with a block end surface 11a (end surface of fixing member 11 on opposite side of ferrule 9). The plurality of types of optical fiber arrays 1 are fixed to the fixing member 11 while being fusion spliced such that the positions of the cores match those in the plurality of the same type of high-Δ optical fiber arrays 5. In the first embodiment, as illustrated in FIG. 1, the plurality of types of optical fiber arrays 1 extend from the fixing member 11 toward the ferrule 9 and are exposed. The fixing member 11 connects the block end surface 11a to the optical element to be connected, thereby optically coupling the plurality of the same type of high-Δ optical fiber arrays 5 to the optical element. The fixing member 11 fixes the relative positions of the plurality of the same type of high-Δ optical fiber arrays 5 and the optical element in this state.

Figure 2:
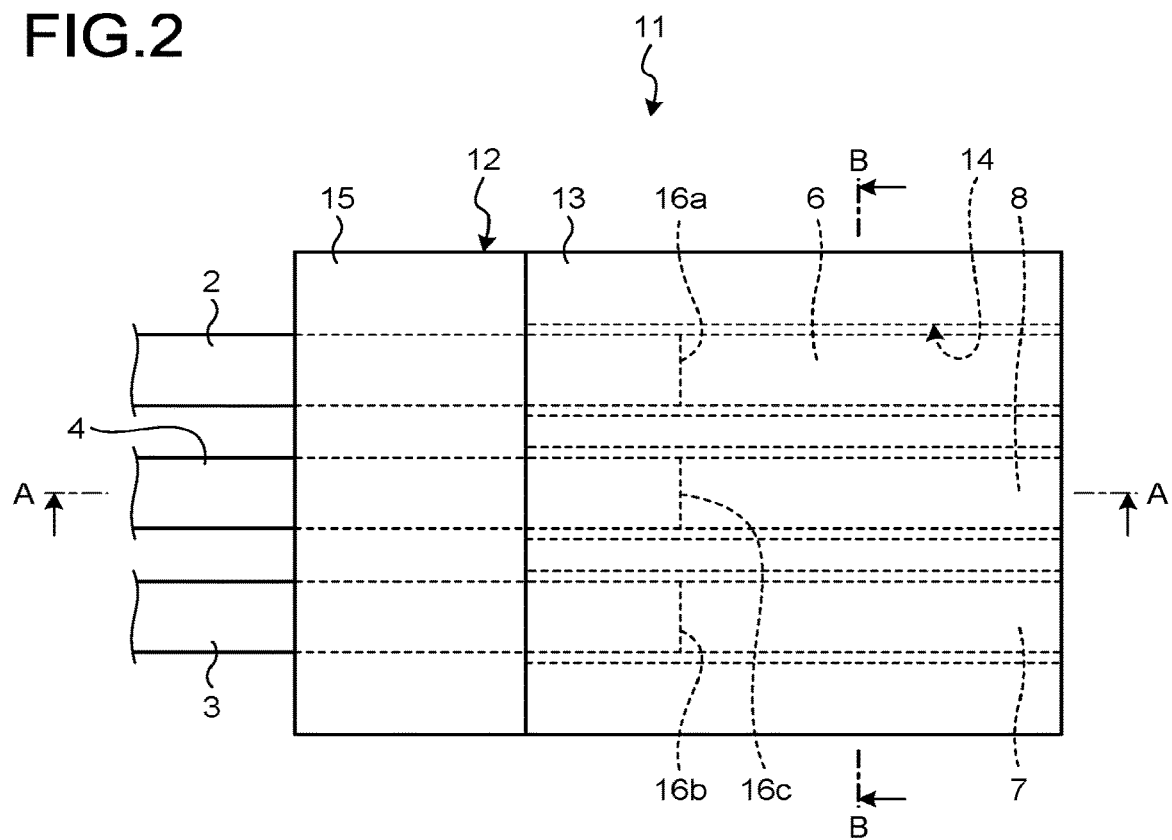
FIG. 2 is a schematic diagram illustrating an example of the arrangement of optical fibers in a fixing member in the first embodiment of the present disclosure.
Figure 3:
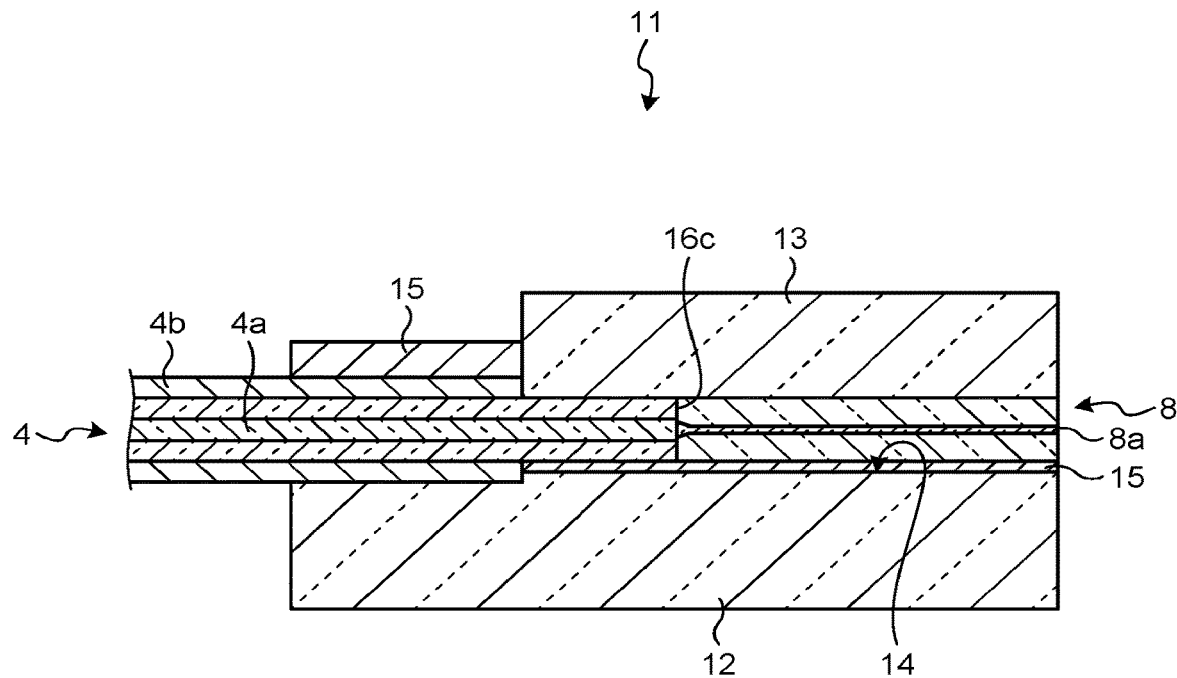
FIG. 3 is a schematic cross-sectional diagram of the fixing member taken along the line A-A illustrated in FIG. 2.
Figure 4:
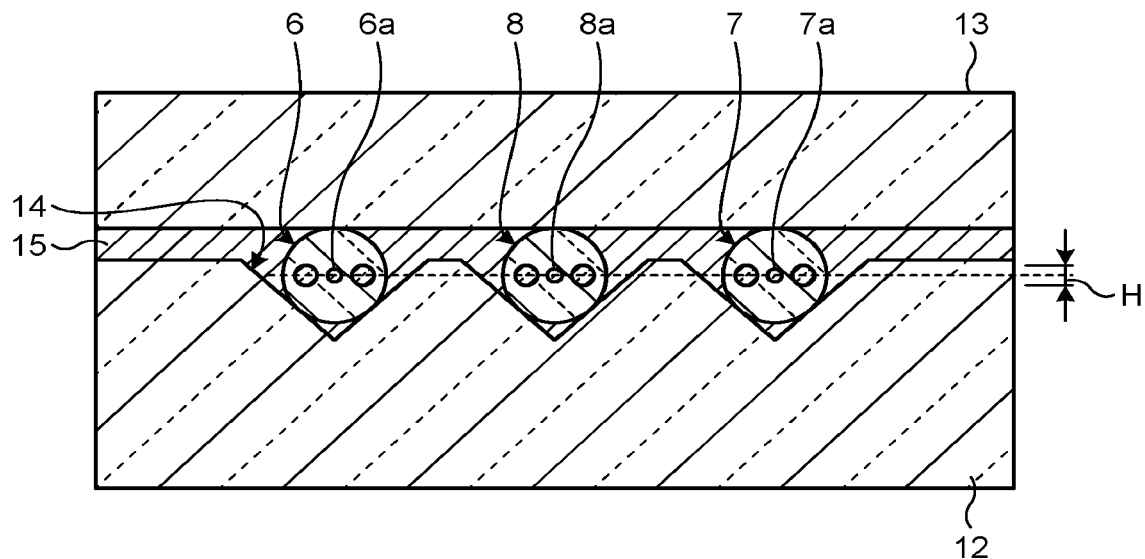
FIG. 4 is a schematic cross-sectional diagram of the fixing member taken along the line B-B illustrated in FIG. 2.

FIG. 2 is a schematic diagram illustrating an example of the arrangement of optical fibers in the fixing member in the first embodiment of the present disclosure. FIG. 3 is a schematic cross-sectional diagram of the fixing member taken along the line A-A illustrated in FIG. 2. FIG. 3 schematically illustrates the cross section of the fixing member 11 in a direction including the optical axes of the polarization maintaining optical fiber 4 and the high-Δ optical fiber 8. FIG. 4 is a schematic cross-sectional diagram of the fixing member taken along the line B-B illustrated in FIG. 2. FIG. 4 schematically illustrates the cross sections of the fixing member 11 and the high-Δ optical fibers 6, 7, and 8 as seen from the block end surface 11a side.

As illustrated in FIGS. 1 to 4, the fixing member 11 includes a substrate 12 and a top plate 13. The fixing member 11 has V-shaped grooves 14 that receives the plurality of the same type of high-Δ optical fiber arrays 5 with the coating removed. For example, the necessary number (three in first embodiment) of the V-shaped grooves 14 are provided in the substrate 12 correspondingly to the plurality of the same type of high-Δ optical fiber arrays 5. The fixing member 11 sandwiches the high-Δ optical fibers 6, 7, and 8 disposed in the V-shaped grooves 14 between the substrate 12 (specifically, V-shaped grooves 14) and a flat surface of the top plate 13.

In the first embodiment, as illustrated in FIG. 2, the polarization maintaining type high-Δ optical fiber 6 is fusion spliced to the single-mode optical fiber 2. The polarization maintaining type high-Δ optical fiber 7 is fusion spliced to the single-mode optical fiber 3. The polarization maintaining type high-Δ optical fiber 8 is fusion spliced to the polarization maintaining optical fiber 4. For example, as illustrated in FIG. 3, the polarization maintaining optical fiber 4 and the high-Δ optical fiber 8 are fusion spliced by matching the positions of cores 4a and 8a thereof. In this case, heating conditions of fusion splicing are adjusted such that a change in mode field diameter at a fusion splice point 16c between the polarization maintaining optical fiber 4 and the high-Δ optical fiber 8 is smoothed to reduce connection loss. The same applies to a fusion splice point 16a between the single-mode optical fiber 2 and the high-Δ optical fiber 6 and a fusion splice point 16b between the single-mode optical fiber 3 and the high-Δ optical fiber 7.

As illustrated in FIGS. 2 and 3, the fusion splice point 16c between the polarization maintaining optical fiber 4 and the high-Δ optical fiber 8 is located inside the V-shaped groove 14. In other words, the fusion splice point 16c is sandwiched between the V-shaped groove 14 and the top plate 13. The coating of the polarization maintaining optical fiber 4 and the high-Δ optical fiber 8 is peeled in a region sandwiched between the V-shaped groove 14 and the top plate 13, and glass parts (claddings) of the polarization maintaining optical fiber 4 and the high-Δ optical fiber 8 are directly sandwiched between the V-shaped groove 14 and the top plate 13. Similarly, the fusion splice points 16a and 16b between the single-mode optical fibers 2 and 3 and the high-Δ optical fibers 6 and 7 are located inside the V-shaped grooves 14, and glass parts (claddings) of the single-mode optical fibers 2 and 3 and the high-Δ optical fibers 6 and 7 are directly sandwiched between the V-shaped grooves 14 and the top plate 13.

As illustrated in FIGS. 2 to 4, gaps between the single-mode optical fibers 2 and 3, the polarization maintaining optical fiber 4, the substrate 12 (including V-shaped grooves 14), and the top plate 13 are filled with adhesive 15. These optical fibers and members are fixed by the filled adhesive 15. Furthermore, the single-mode optical fibers 2 and 3 and the polarization maintaining optical fiber 4 are fixed to the substrate 12 by adhesive 15 from above coating members of the optical fibers (for example, coating member 4b of polarization maintaining optical fiber 4 illustrated in FIG. 3) in a region not sandwiched between the V-shaped groove 14 and the top plate 13.

In the above-mentioned configuration, it is preferred that the outer diameters of the fusion splice points 16a and 16b be smaller than the outer diameters of the single-mode optical fibers 2 and 3 and the high-Δ optical fibers 6 and 7 therearound. Similarly, it is preferred that the outer diameter of the fusion splice point 16c be smaller than the outer diameters of the polarization maintaining optical fiber 4 and the high-Δ optical fiber 8 therearound. The reasons are as follows. For example, the fusion splice point 16a is sandwiched between the V-shaped groove 14 and the top plate 13 as described above, and hence may receive stress from the V-shaped groove 14 and the top plate 13. When the fusion splice point 16a receives stress, the connection loss at the fusion splice point 16a increases. By processing the fusion splice point 16a such that the outer diameter of the fusion splice point 16a becomes smaller than the outer diameter of the optical fibers therearound as described above, the stress received by the fusion splice point 16a from the V-shaped groove 14 and the top plate 13 can be reduced to suppress the increase in connection loss. The same applies to the remaining fusion splice points 16b and 16c.

When the fusion splice point 16a contacts the top plate 13, mechanical reliability of the fusion splice point 16a may be lost. By configuring the outer diameter of the fusion splice point 16a to be smaller than the outer diameters of the optical fibers therearound, the possibility that the mechanical reliability is lost can be reduced. The same applies to the remaining fusion splice points 16b and 16c.

As a method for controlling the outer diameters of the fusion splice points 16a, 16b, and 16c, a method for controlling a pushing amount and a retreat amount of optical fibers to be fusion spliced and a method for etching a fusion splice point of optical fibers after fusion splicing can be used.

The high-Δ optical fibers 6, 7, and 8 disposed in the V-shaped grooves 14 in the fixing member 11 are of the same type. For example, the high-Δ optical fibers 6, 7, and 8 are cut from polarization maintaining type high-Δ optical fibers in the same production lot. When the high-Δ optical fibers 6, 7, and 8 are of the same type in this manner, the difference in cladding diameter among the high-Δ optical fibers 6, 7, and 8 is reduced as compared with the difference in cladding diameter among optical fibers of different types. Thus, as illustrated in FIG. 4, when the high-Δ optical fibers 6, 7, and 8 are disposed in the V-shaped grooves 14, the positions of cores 6a, 7a, and 8a of the high-Δ optical fibers 6, 7, and 8 are aligned (with small fluctuation) in a height direction (depth direction of V-shaped groove 14). In other words, a misalignment amount (core misalignment amount H illustrated in FIG. 4) of center axes of the cores 6a, 7a, and 8a among the high-Δ optical fibers 6, 7, and 8 falls within an acceptable level that is accepted from the viewpoint of reduction in connection loss between a high-Δ optical fiber and an optical waveguide. As a result, the core axis misalignment amounts between the optical waveguides in the optical element connected to the block end surface 11a of the fixing member 11 and the high-Δ optical fibers 6, 7, and 8 sandwiched between the V-shaped grooves 14 and the top plate 13 of the fixing member 11 are reduced, and hence the connection loss between the high-Δ optical fibers 6, 7, and 8 and the optical waveguides may be reduced to the above-mentioned acceptable level or less (for example, 1 dB or less). In this manner, by using the same type of optical fibers, such as the high-Δ optical fibers 6, 7, and 8, the difference in cladding diameter thereof falls within an acceptable level that is accepted from the viewpoint of reduction in connection loss between the high-Δ optical fibers 6, 7, and 8 and the optical waveguides.

Figure 5:
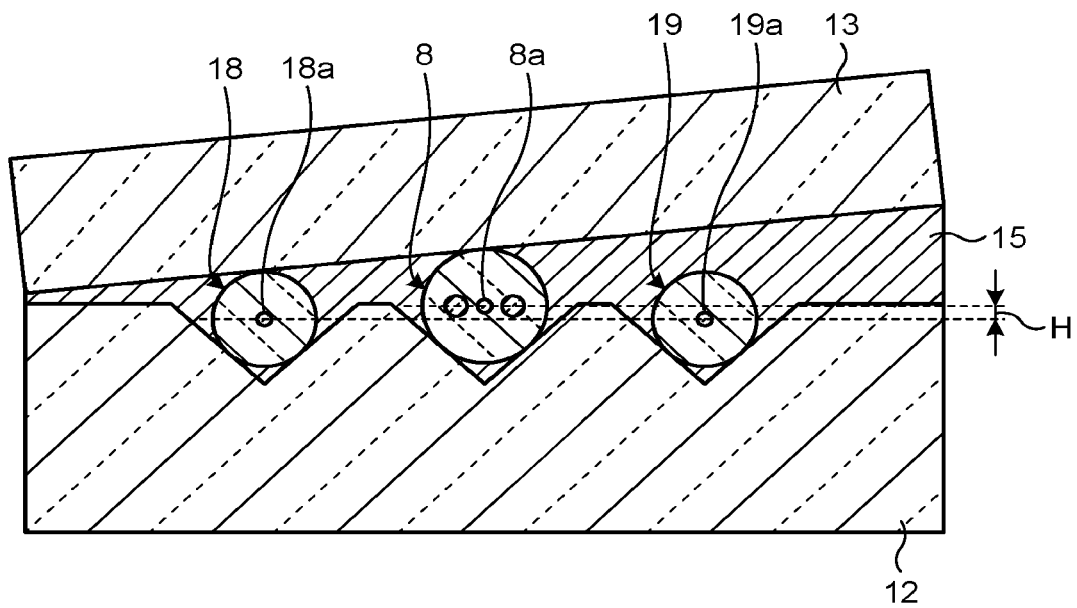
FIG. 5 is a diagram for describing a problem that occurs when a plurality of high-$\Delta$ optical fibers disposed in V-shaped grooves of the fixing member are of different types.

On the other hand, when different types of high-Δ optical fibers are disposed in the V-shaped grooves 14 in the fixing member 11, it is difficult to reduce connection loss between the high-Δ optical fiber in each V-shaped groove 14 and an optical waveguide of an optical element. FIG. 5 is a diagram for describing a problem that occurs when a plurality of high-Δ optical fibers disposed in the V-shaped grooves in the fixing member are of different types. For example, in FIG. 5, single-mode type high-Δ optical fibers 18 and 19, which are of a type different from the high-Δ optical fiber 8, are disposed in the V-shaped groove 14 instead of the polarization maintaining type high-Δ optical fibers 6 and 7, which are of the same type as the high-Δ optical fiber 8. Note that the single-mode type high-Δ optical fibers 18 and 19 have the same configuration as that of the normal single-mode optical fibers 2 and 3, respectively, except that the relative refractive-index difference between a core and a cladding is larger than that in optical fibers to be connected included in the plurality of types of optical fiber 1 arrays.

As illustrated in FIG. 5, the high-Δ optical fiber 8 is of a type different from the other high-Δ optical fibers 18 and 19 arranged in parallel to each other, and hence a difference in cladding diameter occurs between the high-Δ optical fibers 18 and 19 of the same type and the high-Δ optical fiber 8 of a different type. For example, when a design dimensional tolerance of the cladding diameter in the high-Δ optical fibers 8, 18, and 19 is ±1 μm, the difference in cladding diameter caused between the high-Δ optical fibers 18 and 19 and the high-Δ optical fiber 8 may be approximately 2 μm. As an example, a difference of more than 1 μm and 2 μm or less occurs in the cladding diameters between the high-Δ optical fibers 18 and 19 and the high-Δ optical fiber 8 illustrated in FIG. 5.

When such high-Δ optical fibers 8, 18, and 19 of different types are disposed in the V-shaped grooves 14, as illustrated in FIG. 5, the core misalignment occurs in the depth direction of the V-shaped grooves 14 depending on the above-mentioned difference in cladding diameter between cores 18a and 19a of the high-Δ optical fibers 18 and 19 and the core 8a of the high-Δ optical fiber 8. This core misalignment amount H increases as the above-mentioned difference in cladding diameter increases.

When the cores 18a and 19a of the high-Δ optical fibers 18 and 19 of the same type among the high-Δ optical fibers 8, 18, and 19 causing the core misalignment as described above are positioned with the cores of the optical waveguides in the optical element, core axis deviation occurs between the core 8a of the high-Δ optical fiber 8 of the type different from these optical fibers and the core of the optical waveguide in the optical element. Even if the core 8a of the high-Δ optical fiber 8 is positioned with the core of the optical waveguide, core axis deviation occurs between the cores 18a and 19a of the high-Δ optical fibers 18 and 19 of the type different from the high-Δ optical fiber 8 and the cores of the optical waveguides. In any case, core axis deviation occurs between the high-Δ optical fibers 8, 18, and 19 and the optical waveguides in the optical element, and as a result, it is difficult to reduce the connection loss when optically coupling the high-Δ optical fibers 8, 18, and 19 and the optical waveguides in the optical element.

Note that, in FIG. 5, the case where the cladding diameter of the high-Δ optical fiber 8 of a different type is larger than those of the high-Δ optical fibers 18 and 19 of the same type has been exemplified, but the above-mentioned problem of connection loss is not limited to this case. In other words, even when the cladding diameter of the high-Δ optical fiber 8 is smaller than those of the high-Δ optical fibers 18 and 19, the core axis deviation similarly occurs between the high-Δ optical fibers 8, 18, and 19 and the optical waveguides in the optical element except that the direction of core misalignment is reverse to the above-mentioned direction, with the result that the above-mentioned problem of connection loss can occur. The above-mentioned problem of connection loss can similarly occur even when the high-Δ optical fiber 8 of a different type is disposed in any of the plurality of (three in first embodiment) V-shaped grooves 14 provided in the substrate 12.

As illustrated in FIG. 5, when the high-Δ optical fibers 8, 18, and 19 of different types are disposed in the V-shaped grooves 14, the top plate 13 sandwiching the high-Δ optical fibers 8, 18, and 19 with the V-shaped grooves 14 may be inclined with respect to the substrate 12. In this case, the difference in direction of the inclination of the top plate 13 occurs in the thickness of the adhesive 15 filled between the substrate 12 and the top plate 13. The difference in thickness of the adhesive 15 causes stress fluctuation in a layer of the adhesive 15 after curing. Accordingly, the difference occurs in stress applied from the adhesive 15 to the high-Δ optical fibers 8, 18, and 19, the substrate 12, and the top plate 13, and hence there is a problem in that optical characteristics of the high-Δ optical fibers 8, 18, and 19 and bonding reliability of the substrate 12 and the top plate 13 deteriorate. Note that this problem can similarly occur even when the high-Δ optical fiber 8 of a different type is disposed in any of the V-shaped grooves 14 provided in the substrate 12.

Next, connection loss between the plurality of the same type of high-Δ optical fiber arrays 5 and optical waveguides in an optical element in the present disclosure is described. The plurality of the same type of high-Δ optical fiber arrays 5 and the optical waveguides have different mode field diameters, and hence, first, the relationship between the core axis misalignment amount of the high-Δ optical fiber and the optical waveguide having different mode filed diameters and the connection loss was examined. Specifically, the size of an optical waveguide connected to a high-Δ optical fiber having a predetermined mode field diameter was changed, and connection loss corresponding to the core axis misalignment amount between the high-Δ optical fiber and the optical waveguide was calculated for each size of the optical waveguide. As a result, it was understood that even when the size of the optical waveguide connected to the high-Δ optical fiber was changed, the change in connection loss corresponding to the core axis misalignment amount between the high-Δ optical fiber and the optical waveguide was small. Thus, there is no problem if the connection loss corresponding to the core axis misalignment amount between a high-Δ optical fiber and an optical waveguide having different mode field diameters is calculated by using a model that supposes the connection of optical fibers of the same type.

Figure 6:
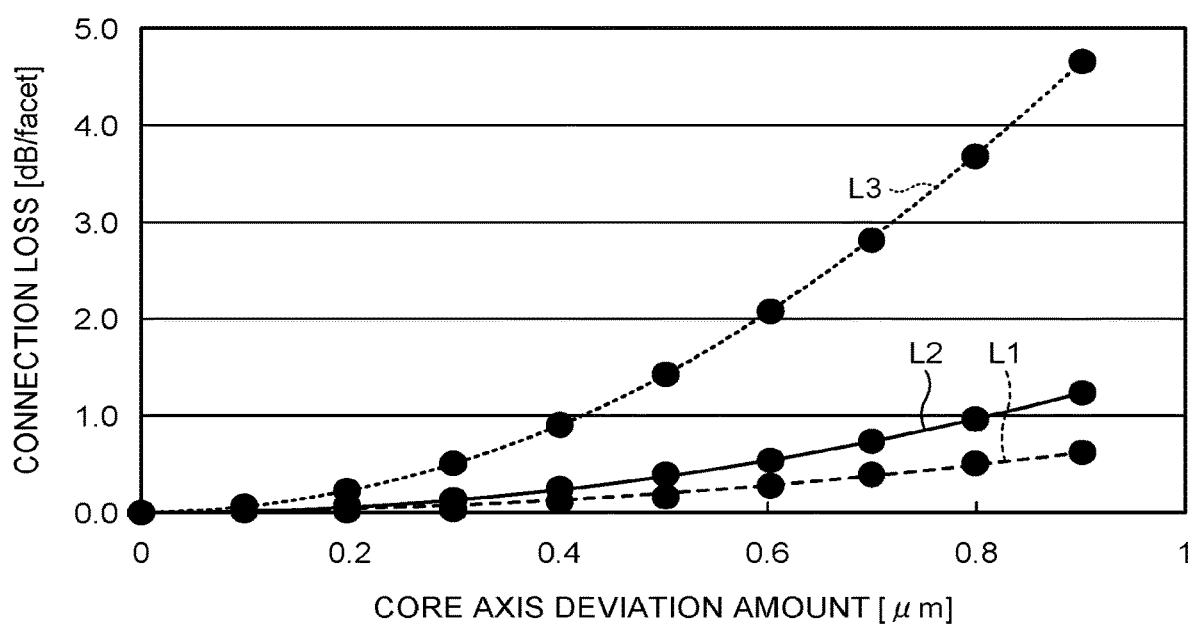
FIG. 6 is a diagram illustrating an example of a relationship between a core axis misalignment amount and connection loss when optical fibers of the same type are connected.

Based on the above-mentioned result, the connection loss corresponding to the core axis misalignment amount when the optical fibers are connected was calculated from a model that supposes the connection of the optical fibers of the same type. FIG. 6 is a diagram illustrating an example of the relationship between the core axis misalignment amount and the connection loss when optical fibers of the same type are connected. In FIG. 6, the line L1 indicates a relationship between a core axis misalignment amount and connection loss calculated for the connection of single-mode optical fibers. The line L2 indicates a relationship between a core axis misalignment amount and connection loss calculated for the connection of high-Δ optical fibers having a mode field diameter of 4.5 µm. The line L3 indicates a relationship between a core axis misalignment amount and connection loss calculated for the connection of high-Δ optical fibers having a mode field diameter of 3.5 µm.

The core axis misalignment amount X µm between the plurality of the same type of high-Δ optical fiber arrays 5 disposed in the V-shaped grooves 14 in the above-mentioned fixing member 11 and optical waveguides in an optical element is expressed by the following Equation (1) by using a difference ΔR µm in cladding diameter among high-Δ optical fibers included in the plurality of the same type of high-Δ optical fiber arrays 5 and an angle θ rad formed by the bottom part of the V-shaped groove 14.

$$X = \Delta R / \sin(\theta/2)/2 \quad (1)$$

As connection loss corresponding to the core axis misalignment amount between the plurality of the same type of high-Δ optical fiber arrays 5 and the optical waveguides in the optical element, as described above, connection loss calculated from a model that supposes connection of optical fibers of the same type can be used. For example, when the mode field diameter of each of the plurality of the same type of high-Δ optical fiber arrays 5 is 4.5 µm, connection loss corresponding to a core axis misalignment amount indicated by the line L2 in FIG. 6 can be used as the connection loss corresponding to the core axis misalignment amount between the plurality of the same type of high-Δ optical fiber arrays 5 and the optical waveguides in the optical element. In the case of reducing the connection loss between the plurality of the same type of high-Δ optical fiber arrays 5 and the optical waveguides in the optical element to 1 dB or less, the core axis misalignment amount X acceptable for the connection is 0.8 µm or less based on the line L2 in FIG. 6. To satisfy the condition that the core axis misalignment amount X≤0.8 µm, for example, when the angle θ of the V-shaped groove 14 is π/2 rad (=90°), the difference ΔR in cladding diameter among high-Δ optical fibers included in the plurality of the same type of high-Δ optical fiber arrays 5 needs to be 1 µm or less. The plurality of the same type of high-Δ optical fiber arrays 5 are formed from high-Δ optical fibers of the same type as exemplified by the above-mentioned high-Δ optical fibers 6, 7, and 8, and hence the above-mentioned condition of the difference ΔR in cladding diameter can be easily satisfied.

The difference ΔR in cladding diameter acceptable from the viewpoint of reducing the connection loss between the high-Δ optical fiber and the optical waveguide can be easily satisfied in the range of the possible mode field diameter (for example, 3.0 µm or more and 5.0 µm or less) of the high-Δ optical fiber by forming the plurality of high-Δ optical fibers disposed in the V-shaped grooves 14 as high-Δ optical fibers of the same type, without being limited to the case where the mode field diameter is 4.5 µm. By reducing the difference ΔR in cladding diameter to the above-mentioned acceptable level or less, the inclination of the top plate 13 with respect to the substrate 12 of the fixing member 11 can be suppressed to solve the above-mentioned problem caused by the inclination of the top plate 13 as a result.

Figure 7:
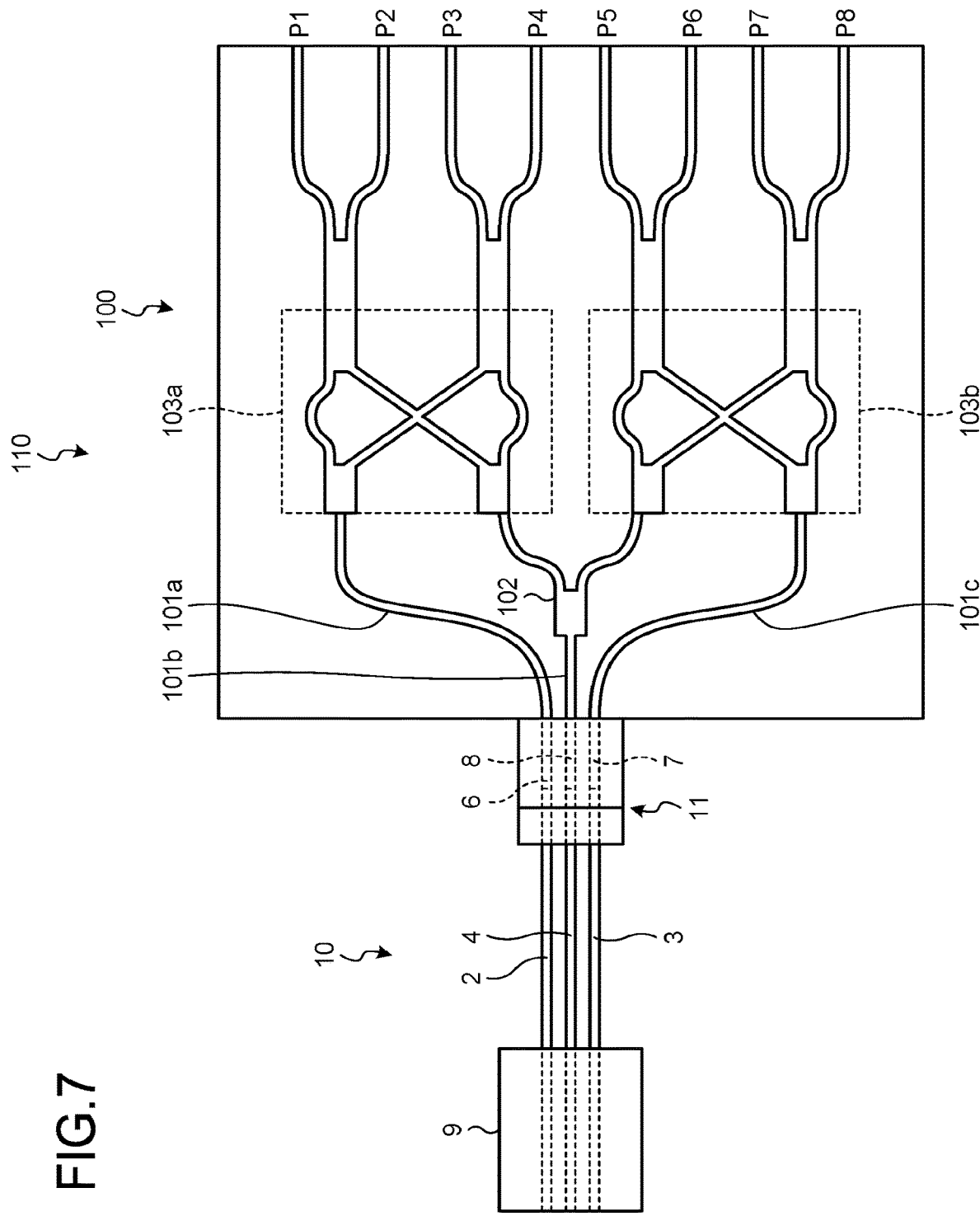
FIG. 7 is a schematic diagram illustrating a configuration example of an optical component to which the optical connection component according to the first embodiment of the present disclosure is applied.

Next, an application example of the optical connection component 10 for an optical element is described. FIG. 7 is a schematic diagram illustrating a configuration example of an optical component to which the optical connection component 10 according to the first embodiment of the present disclosure is applied. As illustrated in FIG. 7, an optical component 110 includes the optical connection component 10 and an optical element 100. The optical element 100 functions as, for example, a coherent mixer used for DP-QPSK coherent modulation. In the optical connection component 10, the block end surface 11a (see FIG. 1) of the fixing member 11 is connected to an input end surface of the optical element 100, so that the high-Δ optical fibers 6, 7, and 8 are optically coupled to optical waveguides 101a, 101c, and 101b in the optical element 100, respectively. Although not particularly illustrated, the ferrule 9 is connected to a plurality of optical waveguides or an array type optical fiber that are optically coupled to the single-mode optical fibers 2 and 3 and the polarization maintaining optical fiber 4. Note that the schematic circuit diagram illustrated in FIG. 7 is an example of a circuit used for the optical element 100, and the present disclosure is not limited to the circuit.

As illustrated in FIG. 7, the optical element 100 includes two signal ports, a local oscillation light port, and eight output ports P1 to P8. The two signal ports and the local oscillation light port are ports for inputting light from the single-mode optical fibers 2 and 3 and the polarization maintaining optical fiber 4 in the optical connection component 10 through the high-Δ optical fibers 6, 7, and 8, respectively. The eight output ports P1 to P8 are ports for outputting light to a plurality of optical fibers (not illustrated) connected thereto.

In the optical element 100 illustrated in FIG. 7, polarization is divided in advance, and two signal light beams whose place of polarization has been adjusted to TM polarization are input to the optical waveguides 101a and 101c from the two single-mode optical fibers 2 and 3 through the high-Δ optical fibers 6 and 7. The signal light input to the optical waveguide 101a is guided to a 90-degree hybrid element 103a, and the signal light input to the optical waveguide 101c is guided to a 90-degree hybrid element 103b.

On the other hand, local oscillation light having TM polarization is input from the polarization maintaining optical fiber 4 to the optical waveguide 101b through the high-Δ optical fiber 8. The local oscillation light input to the optical waveguide 101b is branched into two by a power splitter 102, and guided to the 90-degree hybrid elements 103a and 103b, respectively.

In the 90-degree hybrid elements 103a and 103b, the signal light and the local oscillation light interfere with each other to be split into signal light having I-channel components and signal light having Q-channel components, and output light is output from the eight output ports P1 to P8.

As described above, in the optical connection component 10 according to the first embodiment of the present disclosure, the high-Δ optical fibers fusion spliced to the plurality of types of optical fiber arrays 1 are the plurality of the same type of high-Δ optical fiber arrays 5, which are of the same type, the plurality of the same type of high-Δ optical fiber arrays 5 are disposed in the V-shaped grooves 14 of the fixing member 11 in the state in which the coating is removed, and the relative positions of the plurality of the same type of high-Δ optical fiber arrays 5 and the optical element when optically coupling the plurality of the same type of high-Δ optical fiber arrays 5 fusion spliced to the plurality of types of optical fiber arrays 1 to the optical element are fixed by the fixing member 11.

Thus, the difference in cladding diameter among the plurality of the same type of high-Δ optical fiber arrays 5 can be suppressed to an acceptable level or less that is acceptable from the viewpoint of reducing the connection loss between a high-Δ optical fiber and an optical waveguide. As a result, the core axis deviations between the plurality of the same type of high-Δ optical fiber arrays 5 disposed in the V-shaped grooves 14 and the optical waveguides in the optical element to be connected can be reduced, and hence the connection loss between the optical waveguide in the optical element and an optical fiber such as the high-Δ optical fiber optically coupled to the optical waveguide can be reduced to the above-mentioned acceptable level or less (for example, 1 dB or less).

In the optical connection component 10 according to the first embodiment of the present disclosure, the fusion splice points between the plurality of the same type of high-Δ optical fiber arrays 5 and the plurality of types of optical fiber arrays 1 and the plurality of the same type of high-Δ optical fiber arrays 5 are housed in the fixing member 11. Thus, a member such as a reinforcing sleeve, which has been necessary in the related art for fusion splicing the plurality of the same type of high-Δ optical fiber arrays 5 and the plurality of types of optical fiber arrays 1, becomes unnecessary, and hence the downsizing of the optical connection component 10 can be prompt.

Modification of First Embodiment

Figure 8:
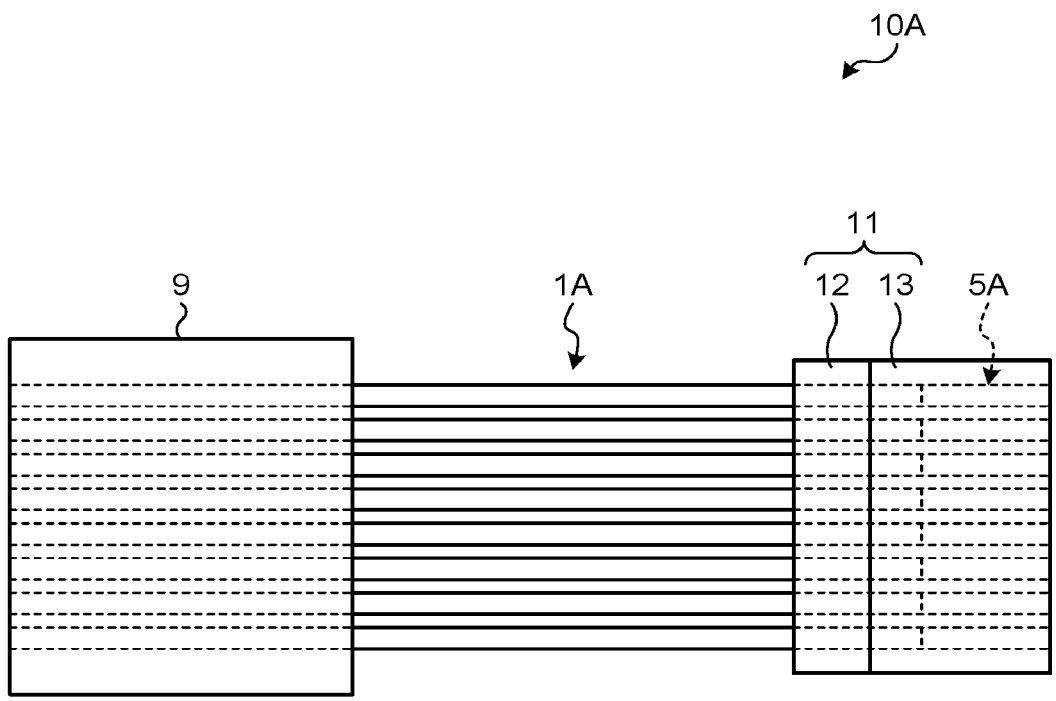
FIG. 8 is a diagram schematically illustrating a configuration example of an optical connection component according to a modification of the first embodiment of the present disclosure.

Next, a modification of the first embodiment of the present disclosure is described. FIG. 8 is a diagram schematically illustrating a configuration example of an optical connection component according to the modification of the first embodiment of the present disclosure. As illustrated in FIG. 8, an optical connection component 10A includes a plurality of types of optical fiber arrays 1A formed from optical fibers in a multiple number of 4 instead of the above-mentioned plurality of types of optical fiber arrays 1, and includes a plurality of the same type of high-Δ optical fiber arrays 5A formed from the same number of high-Δ optical fibers as the number of the plurality of types of optical fiber arrays 1A instead of the above-mentioned plurality of the same type of high-Δ optical fiber arrays 5. In the optical connection component 10A, the ferrule 9 is an MT ferrule. Other configurations are the same as in the first embodiment, and the same components are denoted by the same reference symbols.

The plurality of types of optical fiber arrays 1A include a plurality of types of the above-mentioned optical fibers to be connected. The number of optical fibers to be connected included in the plurality of types of optical fiber arrays 1A is a multiple of 4 (for example, 8 as illustrated in FIG. 8). It is preferred that the plurality of types of optical fiber arrays 1A be collectively coated in the state in which the optical fibers to be connected in a multiple number of 4 are arranged in an array, that is, configured as an optical fiber tape core. The plurality of types of optical fiber arrays 1A may include one or more polarization maintaining optical fibers and a plurality of normal single-mode optical fibers, or may include a plurality of polarization maintaining optical fibers and one or more normal single-mode optical fibers. The plurality of types of optical fiber arrays 1A may include one or more polarization maintaining optical fibers, one or more normal single-mode optical fibers, and one or more other single-mode optical fibers, may include one or more normal single-mode optical fibers and one or more other single-mode optical fibers, or may be formed from any of polarization maintaining optical fiber, a normal single-mode optical fiber, and other single-mode optical fibers.

The plurality of the same type of high-Δ optical fiber arrays 5A include a plurality of (specifically, the same number as plurality of types of optical fiber arrays 1A) high-Δ optical fibers of the same type in each of which the relative refractive-index difference between a core and a cladding is larger than that in the plurality of types of optical fiber arrays 1A. The type of high-Δ optical fibers included in the plurality of the same type of high-Δ optical fiber arrays 5A (type of optical fiber classified depending on configurations of core and cladding) is not particularly limited as long as high-Δ optical fibers are of the same type, but it is preferred that the type be the same as the type of any optical fiber to be connected included in the plurality of types of optical fiber arrays 1A. For example, when the plurality of types of optical fiber arrays 1A include only normal single-mode optical fibers, it is preferred that each of the plurality of the same type of high-Δ optical fiber arrays 5A be a high-Δ optical fiber obtained by increasing the relative refractive-index difference between a core and a cladding in the normal single-mode optical fiber. When the plurality of types of optical fiber arrays 1A include a normal single-mode optical fiber and a polarization maintaining optical fiber, it is preferred that each of the plurality of the same type of high-Δ optical fiber arrays 5A be a polarization maintaining type high-Δ optical fiber (for example, the same type as the above-mentioned high-Δ optical fibers 6, 7, and 8) from the viewpoint of maintaining the place of polarization. In each of the plurality of the same type of high-Δ optical fiber arrays 5A, the relative refractive-index difference of the core with respect to the cladding is 2.0% or more and 3.0% or less, and the mode field diameter at a wavelength of 1,550 nm is, for example, 3.0 µm or more and 5.0 µm or less.

The plurality of the same type of high-Δ optical fiber arrays 5A are fusion spliced to the above-mentioned plurality of types of optical fiber arrays 1A. The fusion-spliced plurality of the same type of high-Δ optical fiber arrays 5A are interposed between a plurality of optical waveguides (not illustrated) constituting an optical element and the plurality of types of optical fiber arrays 1A while being fixed to the fixing member 11 similarly to the case in the first embodiment, and are optically coupled to the plurality of optical waveguides.

The above-mentioned plurality of types of optical fiber arrays 1A and the plurality of the same type of high-Δ optical fiber arrays 5A are fusion spliced so as to suppress the connection loss to be low by appropriately determining heating conditions for fusion splicing, such as by applying TEC fusion, so that the change in mode field diameter at the fusion splice point is made smooth. In this manner, it is preferred that the connection loss between the optical fibers to be connected included in the plurality of types of optical fiber arrays 1A and the high-Δ optical fibers included in the plurality of the same type of high-Δ optical fiber arrays 5A be reduced to 0.1 dB or less.

Although not particularly illustrated, when the optical connection component 10A having the above-mentioned configuration is applied to an optical element, an optical component according to the present modification can be configured. Examples of the optical element include a PLC element, a silicon optical waveguide chip, and a coherent mixer.

As described above, in the optical connection component 10A according to the modification of the first embodiment of the present disclosure, the plurality of high-Δ optical fibers that are fusion spliced to the plurality of types of optical fiber arrays 1A are the plurality of the same type of high-Δ optical fiber arrays 5A, which are of the same type, the ferrule 9 is an MT ferrule, and the others are configured similarly to the first embodiment. Thus, the optical connection component to which the MT ferrule is applied, which can obtain the same functions and effects as in the first embodiment, can be configured.

Second Embodiment

Figure 9:
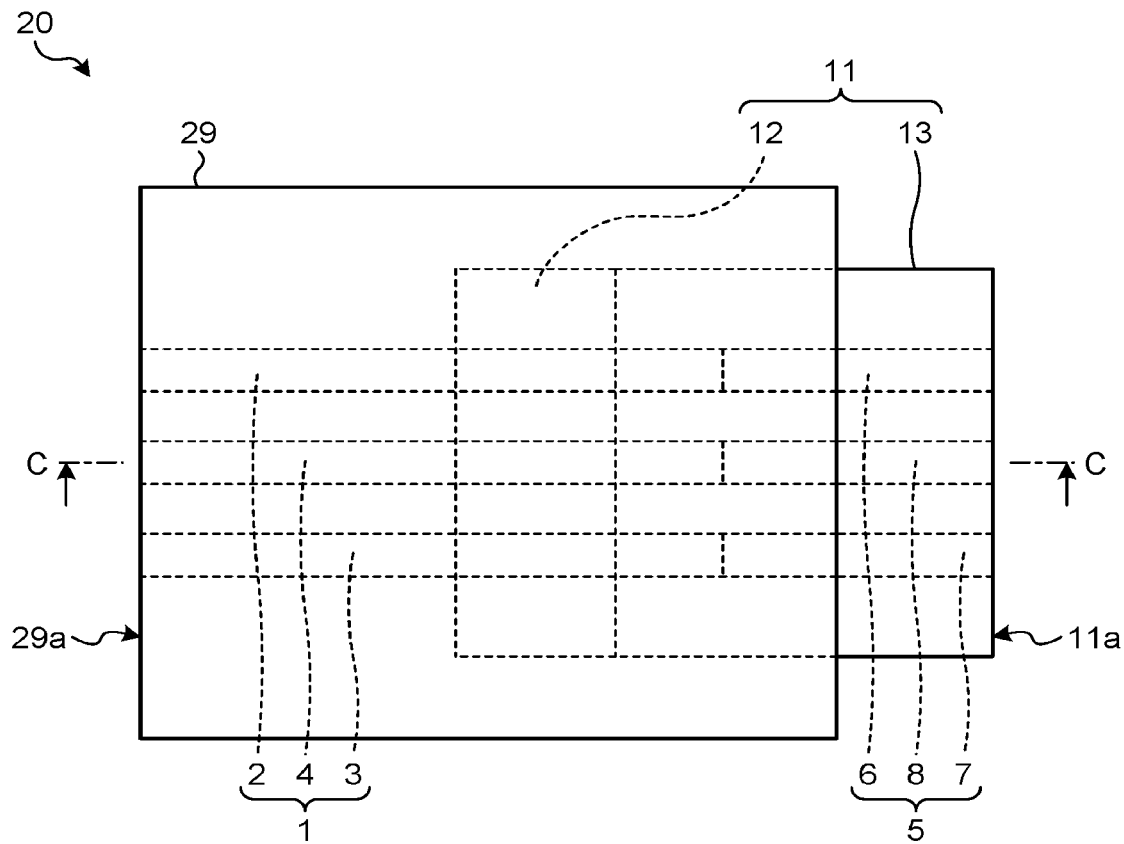
FIG. 9 is a diagram schematically illustrating a configuration example of an optical connection component according to a second embodiment of the present disclosure.

Next, a second embodiment of the present disclosure is described. FIG. 9 is a diagram schematically illustrating a configuration example of an optical connection component according to the second embodiment of the present disclosure. As illustrated in FIG. 9, this optical connection component 20 includes a ferrule 29 instead of the above-mentioned ferrule 9. Other configurations are the same as in the first embodiment, and the same constituent parts are denoted by the same reference symbols.

The ferrule 29 houses therein at least end portions of a plurality of types of optical fiber arrays 1 extending from a fixing member 11 on the opposite side of a plurality of the same type of high-Δ optical fiber arrays 5. In the second embodiment, as illustrated in FIG. 9, the ferrule 29 houses the fixing member 11 and the plurality of types of optical fiber arrays 1 extending from the fixing member 11 therein in the state in which an end portion of the fixing member 11 on the side of the plurality of the same type of high-Δ optical fiber arrays 5 (that is, block end surface 11a and its vicinity) is exposed.

Figure 10:
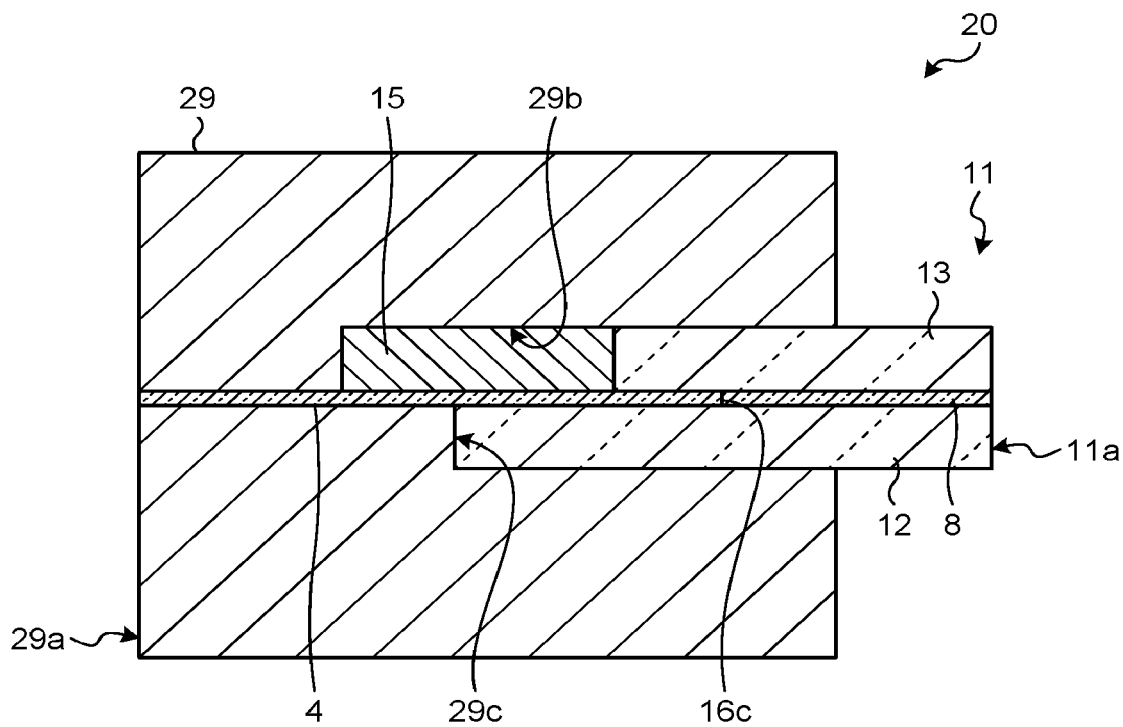
FIG. 10 is a schematic cross-sectional diagram of the optical connection component taken along the line C-C illustrated in FIG. 9.

FIG. 10 is a schematic cross-sectional view of the optical connection component taken along the line C-C illustrated in FIG. 9. FIG. 10 schematically illustrates the cross section of the optical connection component 20 in a direction including the optical axes of the polarization maintaining optical fiber 4 and the high-Δ optical fiber 8. As illustrated in FIGS. 9 and 10, the ferrule 29 has a housing portion 29b and a regulating portion 29c. The housing portion 29b is an internal space in the ferrule 29 for housing the fixing member 11 and the plurality of types of optical fiber arrays 1 therein. The regulating portion 29c regulates the housing position of the fixing member 11 when the fixing member 11 and the plurality of types of optical fiber arrays 1 are housed in the housing portion 29b of the ferrule 29.

The fixing member 11 is pushed into the housing portion 29b of the ferrule 29 from the side of the plurality of types of optical fiber arrays 1. Specifically, as illustrated in FIG. 10, the fixing member 11 is pushed to a position at which the end portion thereof contacts the regulating portion 29c. In this manner, the housing position of the fixing member 11 in the housing portion 29b is determined. As illustrated in FIGS. 9 and 10, the ferrule 29 houses the thus pushed fixing member 11 in the housing portion 29b such that the end portion on the block end surface 11a side is exposed to the outside of the ferrule 29. Together with the housing of the fixing member 11, the ferrule 29 houses therein the plurality of types of optical fiber arrays 1 (for example, single-mode optical fibers 2 and 3 and polarization maintaining optical fiber 4) extending from the fixing member 11. In this case, the ferrule 29 fixes the relative positions of optical fibers to be connected in the plurality of types of housed optical fiber arrays 1. In this stage, the plurality of types of optical fiber arrays 1 are arranged in parallel to one another in the housing portion 29b, and, for example, as exemplified by the polarization maintaining optical fiber 4 illustrated in FIG. 10, the end surfaces thereof are flush with a ferrule end surface 29a (end surface of ferrule 29 on opposite side of fixing member 11). In the second embodiment, it is preferred that the ferrule 29 house the plurality of types of optical fiber arrays 1 with the coating removed in the housing portion 29b together with the fixing member 11.

As illustrated in FIG. 10, adhesive 15 is filled between the housing portion 29b of the ferrule 29, the fixing member 11, and the plurality of types of optical fiber arrays 1. The fixing member 11 and the plurality of types of optical fiber arrays 1 are fixed in the housing portion 29b by the filled adhesive 15.

Although not particularly illustrated, the optical connection component 20 can be applied to the optical element 100 (see FIG. 7) similarly to the above-mentioned first embodiment. In this manner, an optical component in the second embodiment including the optical connection component 20 and the optical element 100 can be configured.

As described above, in the optical connection component 20 according to the second embodiment of the present disclosure, the fixing member 11 and the plurality of types of optical fiber arrays 1 extending from the fixing member 11 are housed in the housing portion 29b of the ferrule 29 in the state in which the end portion of the fixing member 11 on the side of the plurality of the same type of high-Δ optical fiber arrays 5 is exposed, and the others are configured similarly to the first embodiment. Thus, the same functions and effects as in the above-mentioned first embodiment can be obtained, and the housing lengths of the fixing member 11 and the plurality of types of optical fiber arrays 1 housed in the housing portion 29b of the ferrule 29 can be absorbed by the length of the ferrule 29. Consequently, the optical connection component 20 that is downsized correspondingly to the housing lengths can be configured.

In the optical connection component 20 according to the second embodiment of the present disclosure, the plurality of types of optical fiber arrays 1 with the coating removed are housed in the housing portion 29b of the ferrule 29 together with the fixing member 11. Thus, in the case where an optical element to which the optical connection component 20 is connected is subjected to heating treatment, even when the optical connection component 20 is subjected to high temperature heating treatment, the degradation of a coating member that originally coats each of the plurality of types of optical fiber arrays 1 can be prevented.

Modification of Second Embodiment

Next, a modification of a second embodiment of the present disclosure is described. FIG. 11 is a diagram schematically illustrating a configuration example of an optical connection component according to a modification of the second embodiment of the present disclosure. As illustrated in FIG. 11, this optical connection component 20A includes a plurality of types of optical fiber arrays 1A formed from optical fibers in a multiple number of 4 instead of the plurality of types of optical fiber arrays 1, and includes a plurality of the same type of high-Δ optical fiber arrays 5A formed from the same number of high-Δ optical fibers as the number of the plurality of types of optical fiber arrays 1A instead of the plurality of the same type of high-Δ optical fiber arrays 5. In the optical connection component 20A, the ferrule 29 is an MT ferrule. The plurality of types of optical fiber arrays 1A and the plurality of the same type of high-Δ optical fiber arrays 5A are the same as in the above-mentioned modification of the first embodiment. Other configurations are the same as in the first embodiment, and the same components are denoted by the same reference symbols.

In the optical connection component 20A, as illustrated in FIG. 11, the ferrule 29 houses a plurality of types of optical fiber arrays 1A extending from the fixing member 11 therein together with the fixing member 11, and fixes the relative positions of optical fibers to be connected included in the plurality of types of housed optical fiber arrays 1A. In this stage, the plurality of types of optical fiber arrays 1A are arranged in parallel to one another in the ferrule 29 (specifically, in housing portion 29b illustrated in FIG. 10), and end surfaces thereof are flush with a ferrule end surface 29a. In the present modification, it is preferred that the ferrule 29 house the plurality of types of optical fiber arrays 1A with the coating removed therein together with the fixing member 11.

Although not particularly illustrated, when the optical connection component 20A having the above-mentioned configuration is applied to an optical element, an optical component according to the present modification can be configured. Examples of the optical element include a PLC element, a silicon optical waveguide chip, and a coherent mixer.

As described above, in the optical connection component 20A according to the modification of the second embodiment of the present disclosure, the plurality of high-Δ optical fibers that are fusion spliced to the plurality of types of optical fiber arrays 1A are the plurality of the same type of high-Δ optical fiber arrays 5A, which are of the same type, the ferrule 9 is an MT ferrule, and the others are configured similarly to the second embodiment. Thus, the optical connection component to which the MT ferrule is applied, which can obtain the same functions and effects as in the second embodiment, can be configured.

Note that, in the above-mentioned first and second embodiments, the plurality of types of optical fiber arrays 1 in which the normal single-mode optical fibers 2 and 3 and the polarization maintaining optical fiber 4 are mixed have been exemplified, but the present disclosure is not limited thereto. For example, the plurality of types of optical fiber arrays 1 may be formed from any of a polarization maintaining optical fiber, a normal single-mode optical fiber, and other single-mode optical fibers, or may mix two or more of these optical fibers.

In the above-mentioned first and second embodiments, the plurality of the same type of high-Δ optical fiber arrays 5 formed from the polarization maintaining type high-Δ optical fibers have been exemplified, but the present disclosure is not limited thereto. For example, each of the plurality of the same type of high-Δ optical fiber arrays 5 may be a high-Δ optical fiber of the same type as any of optical fibers included in the plurality of types of optical fiber arrays 1 (for example, high-Δ optical fiber obtained by increasing relative refractive-index difference between core and cladding in normal single-mode optical fiber), or may be a high-Δ optical fiber of the same type as an optical fiber that is not included in the plurality of types of optical fiber arrays 1.

In the above-mentioned first and second embodiments and modifications, the fusion splice points between the plurality of types of optical fiber arrays and the plurality of the same type of high-Δ optical fiber arrays are disposed in the V-shaped groove in the fixing member, but the present disclosure is not limited thereto. For example, the above-mentioned fusion splice point is not necessarily required to be disposed in the V-shaped groove in the fixing member. In this case, the above-mentioned fusion splice point may be disposed on the substrate of the fixing member while being coated with a coating member such as a reinforcing sleeve, or may be coated with adhesive and fixed onto the substrate of the fixing member.

In the above-mentioned first and second embodiments, a coherent mixer has been exemplified as the optical element 100 that connects the optical connection components 10 and 20, but the present disclosure is not limited thereto. For example, the optical element 100 that connects the optical connection components 10 and 20 may be optical elements other than a coherent mixer, such as a PLC element and a silicon optical waveguide chip.

The optical connection component according to the present disclosure exhibits an effect that connection loss between an optical waveguide in an optical element and an optical fiber can be reduced when the optical waveguide and the optical fiber are optically coupled.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical connection component comprising:
   a plurality of types of optical fibers;
   a plurality of high relative refractive-index difference optical fibers in each of which a relative refractive-index difference between a core and a cladding is larger than a relative refractive-index difference in each of the plurality of types of optical fibers and which are fusion spliced to the plurality of types of optical fibers;
   a fixing member having a plurality of V-shaped grooves that receive the high relative refractive-index difference optical fibers with coating removed, the fixing member being configured to fix relative positions of the high relative refractive-index difference optical fibers and an optical element when optically coupling the high relative refractive-index difference optical fibers, which have been fusion spliced to the plurality of types of optical fibers, to the optical element; and
   a ferrule that houses therein at least end portions of the plurality of types of optical fibers extending from the fixing member on an opposite side of the high relative refractive-index difference optical fibers, wherein
   the high relative refractive-index difference optical fibers are of a same type,
   the ferrule is configured to
      house therein the plurality of types of optical fibers extending from the fixing member, and
      partially house therein the fixing member, and
   an end portion of the fixing member on a side of the plurality of the plurality of high relative refractive-index difference optical fibers is arranged outside the ferrule.

2. The optical connection component according to claim 1, wherein
   the plurality of types of optical fibers include a polarization maintaining optical fiber, and
   the high relative refractive-index difference optical fibers are polarization maintaining type high relative refractive-index difference optical fibers.

3. The optical connection component according to claim 1, wherein the ferrule houses therein the plurality of types of optical fibers with coating removed together with the fixing member.

4. The optical connection component according to claim 1, wherein the ferrule is an MT ferrule.

5. The optical connection component according to claim 1, wherein the ferrule includes
   a housing portion that is an internal space configured to house the fixing member and the plurality of types of optical fibers therein, and
   a regulating portion configured to regulate a housing position of the fixing member when the fixing member and the plurality of types of optical fibers are housed in the housing portion.

\* \* \* \* \*